(12) United States Patent
Nagaishi et al.

(10) Patent No.: US 11,387,547 B2
(45) Date of Patent: Jul. 12, 2022

(54) ANTENNA, ARRAY ANTENNA, RADAR APPARATUS, AND IN-VEHICLE SYSTEM

(71) Applicant: Hitachi Automotive Systems, Ltd., Hitachinaka (JP)

(72) Inventors: Hideyuki Nagaishi, Tokyo (JP); Akira Kuriyama, Tokyo (JP); Akira Kitayama, Hitachinaka (JP); Hiroshi Kuroda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 372 days.

(21) Appl. No.: 16/611,715

(22) PCT Filed: Apr. 11, 2018

(86) PCT No.: PCT/JP2018/015296
§ 371 (c)(1),
(2) Date: Nov. 7, 2019

(87) PCT Pub. No.: WO2018/225378
PCT Pub. Date: Dec. 13, 2018

(65) Prior Publication Data
US 2021/0143533 A1  May 13, 2021

(30) Foreign Application Priority Data
Jun. 5, 2017 (JP) .............. JP2017-110927

(51) Int. Cl.
*H01Q 1/32* (2006.01)
*G01S 13/931* (2020.01)
(Continued)

(52) U.S. Cl.
CPC .......... *H01Q 1/3233* (2013.01); *G01S 13/931* (2013.01); *H01Q 9/0407* (2013.01); *H01Q 13/02* (2013.01); *H01Q 19/08* (2013.01)

(58) Field of Classification Search
CPC .......... H01Q 1/42; H01Q 15/02; H01Q 15/08; H01Q 19/06; H01Q 19/08; G01S 13/931
See application file for complete search history.

(56) References Cited

U.S. PATENT DOCUMENTS 2,547,416 A * 4/1951 Skellett .................. H01Q 15/08
343/783
2,801,412 A * 7/1957 Maybury ............... H01Q 19/08
343/753
(Continued)

FOREIGN PATENT DOCUMENTS

JP          8-139514 A       5/1996
JP          11-4118 A        1/1999
(Continued)

OTHER PUBLICATIONS

International Search Report (PCT/ISA/210) issued in PCT Application No. PCT/JP2018/015296 dated Jun. 26, 2018 with English translation (four (4) pages).
(Continued)

*Primary Examiner* — Peter M Bythrow
(74) *Attorney, Agent, or Firm* — Crowell & Moring LLP

(57) ABSTRACT

The present invention provides an antenna comprising: a radiation unit that is formed on a substrate; a waveguide that propagates therein radio waves radiated from the radiation unit and radiates the radio waves as a beam; and a dielectric lens that is arranged in an opening of the waveguide and has an incident plane facing the radiation unit and a radiation plane radiating radio waves entered from the incident plane. The radiation plane of the dielectric lens has a plane orientation different from a flat plane perpendicular to the radiation direction of the beam.

10 Claims, 11 Drawing Sheets

CROSS SECTION AT B1-B1'

(51) Int. Cl.
  *H01Q 9/04* (2006.01)
  *H01Q 13/02* (2006.01)
  *H01Q 19/08* (2006.01)

(56) References Cited

U.S. PATENT DOCUMENTS

| | | | | |
|---|---|---|---|---|
| 3,611,392 A * | 10/1971 | Knox | H01Q 19/08 | 343/755 |
| 4,187,507 A * | 2/1980 | Crane | H01Q 19/062 | 342/376 |
| 4,804,970 A * | 2/1989 | Todd | H01Q 15/08 | 264/2.3 |
| 4,888,597 A * | 12/1989 | Rebiez | H01Q 21/0087 | 343/778 |
| 5,162,806 A * | 11/1992 | Monser | H01Q 9/27 | 343/753 |
| 5,455,589 A * | 10/1995 | Huguenin | G01S 7/032 | 342/175 |
| 5,905,457 A * | 5/1999 | Rashid | G01S 13/931 | 342/70 |
| 5,955,752 A * | 9/1999 | Fukaya | H01Q 19/062 | 257/275 |
| 5,978,157 A * | 11/1999 | Matthews | G02B 3/00 | 343/753 |
| 6,043,772 A * | 3/2000 | Voigtlaender | G01S 13/931 | 342/70 |
| 6,072,437 A * | 6/2000 | Zimmerman | H01Q 1/246 | 343/753 |
| 6,340,953 B1 | 1/2002 | Teraoka et al. | | |
| 6,496,138 B1 * | 12/2002 | Honma | H01Q 1/42 | 342/70 |
| 7,075,496 B2 * | 7/2006 | Hidai | H01Q 19/08 | 343/786 |
| 7,355,560 B2 * | 4/2008 | Nagai | H01Q 15/08 | 343/911 R |
| 7,583,074 B1 * | 9/2009 | Lynch | G01S 13/89 | 324/120 |
| 7,961,140 B2 * | 6/2011 | Binzer | H01Q 19/062 | 342/175 |
| 8,184,064 B2 * | 5/2012 | Sanford | H01Q 1/421 | 343/872 |
| 8,765,230 B1 * | 7/2014 | Waldrop, III | H01Q 1/42 | 427/402 |
| 10,305,192 B1 * | 5/2019 | Rappaport | H01Q 13/02 | |
| 10,367,258 B2 * | 7/2019 | Tagi | G01S 13/58 | |
| 10,680,318 B2 * | 6/2020 | Nagata | G01S 13/931 | |
| 10,693,210 B2 * | 6/2020 | Chattopadhyay | H01Q 19/062 | |
| 10,819,026 B2 * | 10/2020 | Sakurai | H01Q 1/3233 | |
| 2001/0013842 A1 * | 8/2001 | Ishikawa | H01Q 19/06 | 343/912 |
| 2002/0067314 A1 * | 6/2002 | Takimoto | H01Q 25/007 | 343/713 |
| 2004/0066346 A1 * | 4/2004 | Huor | H01Q 21/064 | 343/770 |
| 2004/0108963 A1 * | 6/2004 | Clymer | H01Q 3/08 | 343/837 |
| 2004/0119646 A1 * | 6/2004 | Ohno | H01Q 21/064 | 343/700 MS |
| 2005/0062664 A1 * | 3/2005 | Hidai | H01Q 19/08 | 343/786 |
| 2006/0202909 A1 * | 9/2006 | Nagai | H01Q 15/08 | 343/911 R |
| 2006/0220952 A1 * | 10/2006 | Aoki | G01S 13/89 | 342/175 |
| 2006/0220974 A1 * | 10/2006 | Sakakibara | H01Q 13/0225 | 343/772 |
| 2007/0273599 A1 * | 11/2007 | Haziza | H01Q 13/0233 | 343/772 |
| 2009/0021436 A1 * | 1/2009 | Clymer | H01P 1/161 | 343/713 |
| 2009/0066590 A1 * | 3/2009 | Yamada | H01Q 21/0025 | 343/702 |
| 2009/0140912 A1 * | 6/2009 | Kato | G01S 7/4026 | 342/70 |
| 2010/0039346 A1 * | 2/2010 | Peter | H01Q 21/06 | 343/872 |
| 2010/0060537 A1 * | 3/2010 | Nagayama | H01Q 1/247 | 343/776 |
| 2010/0231436 A1 * | 9/2010 | Focke | G01S 13/931 | 342/70 |
| 2011/0248902 A1 * | 10/2011 | Miyagawa | H01Q 19/06 | 343/872 |
| 2012/0249358 A1 * | 10/2012 | Stratis | H01Q 3/267 | 342/62 |
| 2013/0294729 A1 * | 11/2013 | Layton | B82Y 20/00 | 385/40 |
| 2014/0218255 A1 * | 8/2014 | Sanford | H01Q 15/16 | 343/837 |
| 2014/0220903 A1 * | 8/2014 | Schulz | H01Q 1/1257 | 455/67.7 |
| 2015/0116154 A1 * | 4/2015 | Artemenko | H01Q 15/08 | 342/371 |
| 2015/0116155 A1 * | 4/2015 | Chibane | H01Q 1/1257 | 342/372 |
| 2015/0229023 A1 * | 8/2015 | Abe | H01Q 21/0037 | 342/368 |
| 2015/0288068 A1 * | 10/2015 | Suematsu | H01Q 5/45 | 343/776 |
| 2015/0325922 A1 * | 11/2015 | Fujita | H01Q 19/104 | 343/753 |
| 2015/0346334 A1 * | 12/2015 | Nagaishi | H01Q 1/42 | 342/115 |
| 2015/0349414 A1 * | 12/2015 | Tagi | G01S 13/931 | 343/872 |
| 2016/0006129 A1 * | 1/2016 | Haziza | H01Q 15/08 | 343/783 |
| 2016/0344095 A1 * | 11/2016 | Tagi | G01S 13/58 | |
| 2018/0166792 A1 * | 6/2018 | Yoshida | H01Q 3/14 | |
| 2018/0267161 A1 * | 9/2018 | Nagaishi | H01P 5/107 | |
| 2019/0115666 A1 * | 4/2019 | Ochiai | H01Q 17/001 | |

FOREIGN PATENT DOCUMENTS

| | | |
|---|---|---|
| JP | 11-231041 A | 8/1999 |
| JP | 2000-228608 A | 8/2000 |
| JP | 2001-36340 A | 2/2001 |
| JP | 2004-274646 A | 9/2004 |
| JP | 2004-274656 A | 9/2004 |
| JP | 2006-41966 A | 2/2006 |
| JP | 2006-279776 A | 10/2006 |
| JP | 2009-81833 A | 4/2009 |
| JP | 2015-213285 A | 11/2015 |
| JP | 2016-70825 A | 5/2016 |

OTHER PUBLICATIONS

Japanese-language Written Opinion (PCT/ISA/237) issued in PCT Application No. PCT/JP2018/015296 dated Jun. 26, 2018 (four (4) pages).

* cited by examiner

FIG. 1A    FIG. 1D
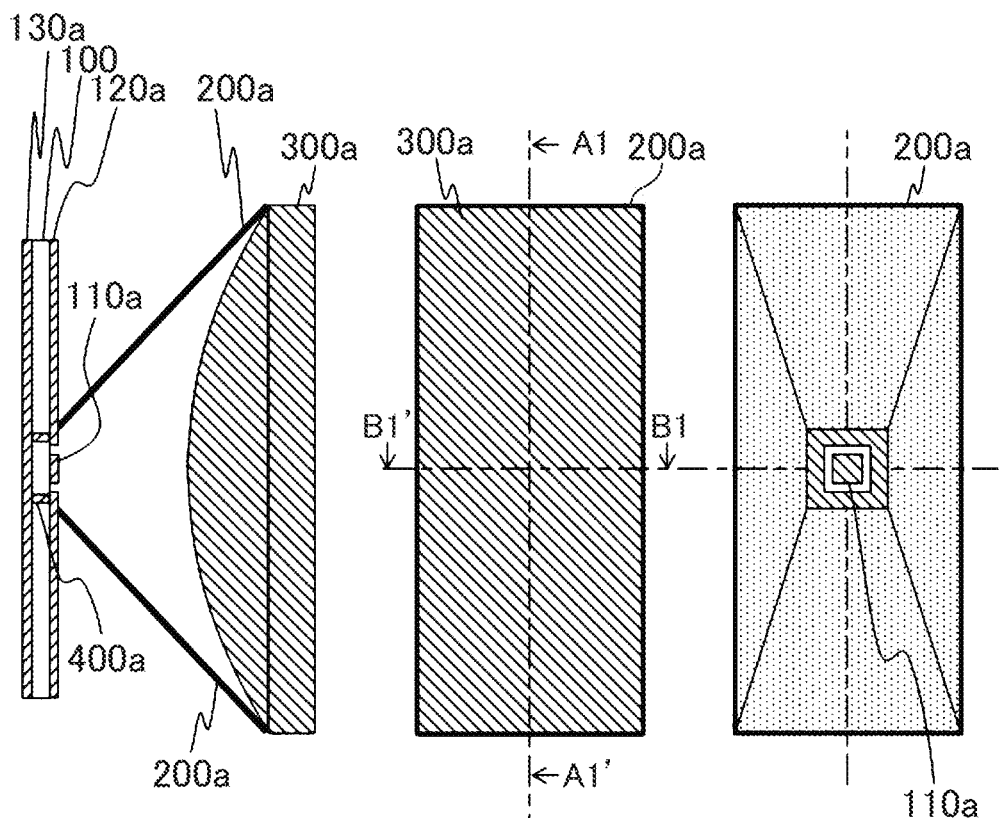
CROSS SECTION AT A1-A1'
FIG. 1B
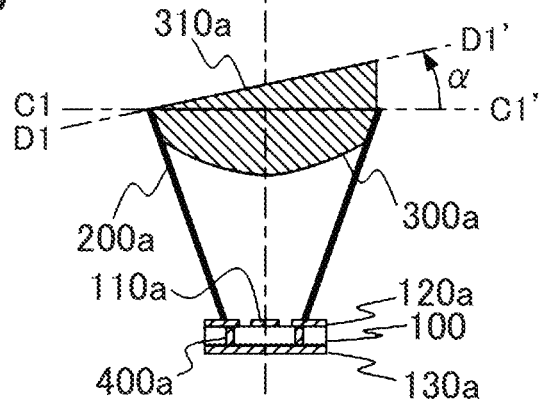
CROSS SECTION AT B1-B1'
FIG. 1C

CROSS SECTION AT A1-A1'

CROSS SECTION AT B1-B1'

FIG. 8A    FIG. 8D
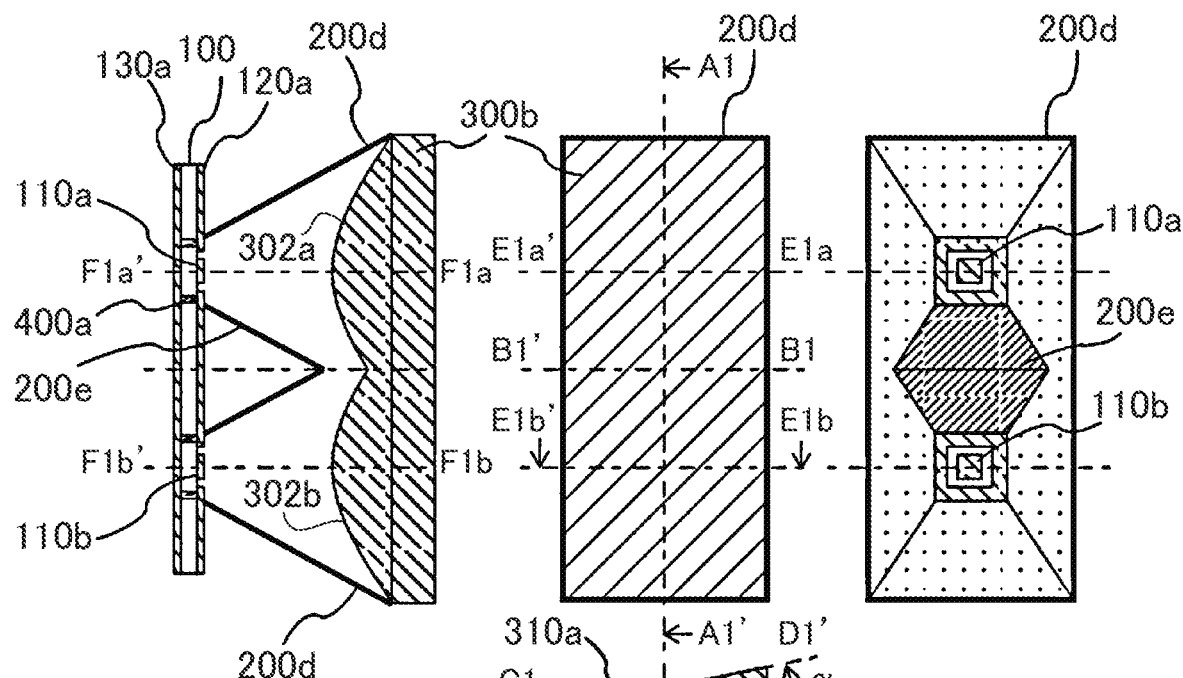
CROSS SECTION AT A1-A1'
FIG. 8B
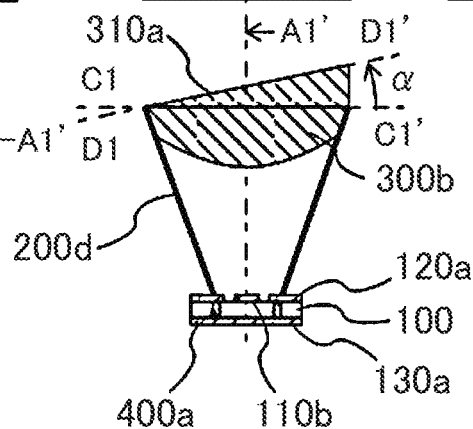
CROSS SECTION AT E1b-E1b'
FIG. 8C FIG. 11A FIG. 11D
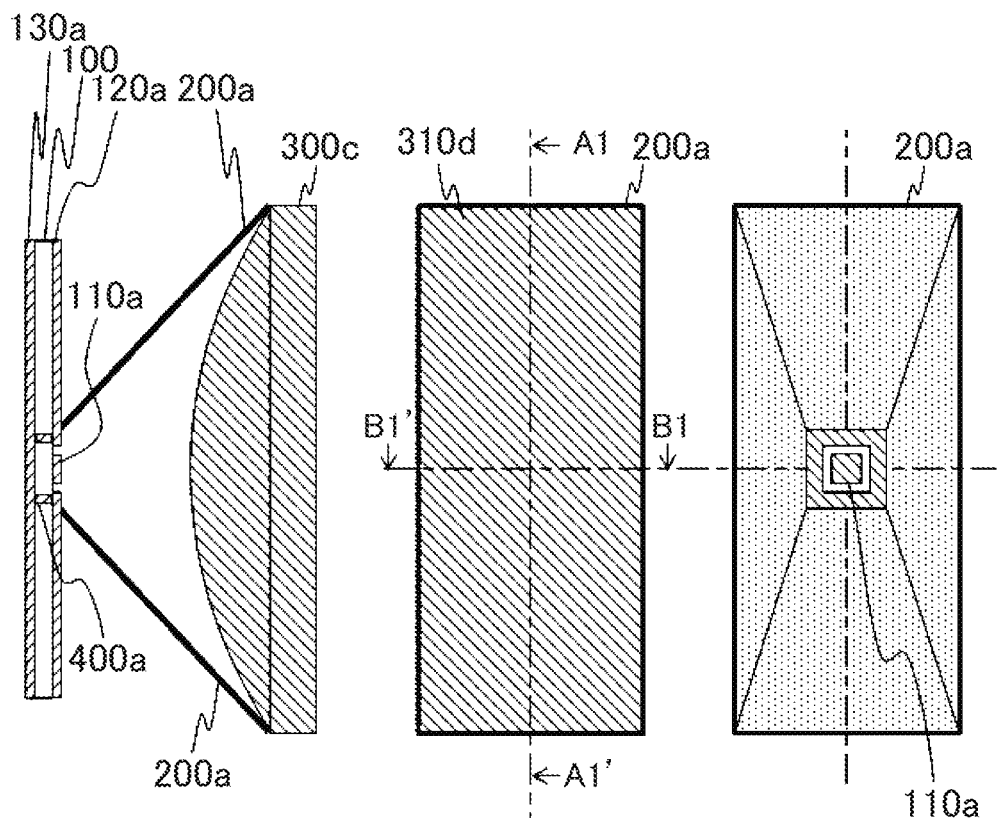
CROSS SECTION AT A1-A1'
FIG. 11B
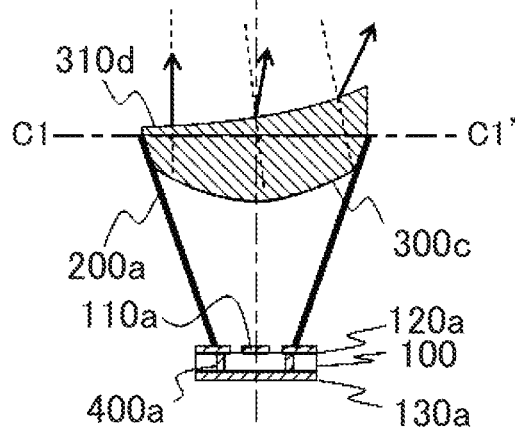
CROSS SECTION AT B1-B1'
FIG. 11C

ANTENNA, ARRAY ANTENNA, RADAR APPARATUS, AND IN-VEHICLE SYSTEM

This application claims a priority of Japanese Patent Application No. 2017-110927 filed on Jun. 5, 2017, and Japanese Patent Application No. 2017-110927 is incorporated into this application by referring to the contents thereof.

TECHNICAL FIELD

The present invention relates to an antenna that generates a flat beam, and a radar sensor apparatus.

BACKGROUND ART

As a surrounding condition detection sensor for safe driving and operations of automobiles, railways, and infrastructure devices, a Doppler sensor or a radar sensor using radio waves has been known. For the purpose of simplifying the following explanation, a radar sensor for automobiles will be described.

In order to realize safe driving support and automated driving, plural sensors with different detection distances and detection angle ranges are used for a radar sensor for automobiles to cover the entire circumference of an automobile. In particular, a forward long-distance radar sensor has been required to have a maximum detection distance of 250 m or longer to be able to safely stop during driving at 200 km/h on the Autobahn in Europe where no speed limitation is set. In addition, it has been desired for a radar sensor for automobiles to have a detection distance of 100 m or longer and a detectable angle range of ±30° so as to be able to secure redundancy of target information when operating with a camera.

As the background art of the technique, Patent Literatures 1 to 5 have been known. Patent Literature 1 discloses an antenna that includes a primary radiator having a patch antenna and a metal horn and a dielectric lens, and the primary radiator is arranged at the focal position of the dielectric lens.

Patent Literature 2 discloses an antenna apparatus with plural directional antennas in which the directional antennas are positioned on the same axis along one direction, and mutual main radiation directions are shifted along a direction orthogonal to the one direction.

Patent Literature 3 discloses an in-vehicle radar apparatus in which a transmission antenna has antenna units with different radiation ranges, an antenna with a wide radiation range is used in a neighborhood monitoring mode in which orientation resolution is low and an effective detection orientation range is wide, an antenna with a narrow radiation range is used in a remote monitoring mode in which orientation resolution is high and an effective detection orientation range is narrow, and two monitoring modes are provided.

Each of Patent Literature 4 and Patent Literature 5 discloses a lens antenna that includes a dielectric lens and a base part in which a waveguide connected to the dielectric lens is formed. The lens antenna is formed in such a manner that the normal direction of a radiation plane of the dielectric lens is directed obliquely upward, the back surface of the dielectric lens swells in an S-shape, and the thickness thereof is gradually increased from the upper side towards the lower side.

CITATION LIST

Patent Literature

[Patent Literature 1] Japanese Unexamined Patent Application Publication No. 2000-228608
[Patent Literature 2] Japanese Unexamined Patent Application Publication No. 2001-036340
[Patent Literature 3] Japanese Unexamined Patent Application Publication No. 2016-70825
[Patent Literature 4] Japanese Unexamined Patent Application Publication No. 2004-274646
[Patent Literature 5] Japanese Unexamined Patent Application Publication No. 2004-274656

SUMMARY OF INVENTION

Technical Problem

As described in the background art, it has been desired for a radar sensor for automobiles to have a maximum detection distance of 250 m or longer, a detection distance of 100 m or longer, and a detectable angle range of ±30° or larger. A radar that forms multiple beams using plural antennas has been developed due to physical limitations of a radar-equation and antenna radiation characteristics.

For an antenna used in a radar sensor for automobiles, a beam of radio waves to be transmitted or received needs to be shaped wide in the horizontal direction and narrow and flat in the perpendicular direction. This reason is to detect a distant obstacle by reducing noise (road clutter noise) caused by unnecessary radiation from the ground to enhance the detection sensitivity of a reception signal in the perpendicular direction while widening a viewing angle for an object in the horizontal direction.

In the antenna disclosed in Patent Literature 1, radio waves radiated in a spherical shape from the primary radiator are condensed by a hyperbolic curved plane of a radiation plane or an incident plane or the spherical shapes of both planes of the lens, or radiated as parallel radio waves so that the gain of the lens antenna is improved.

If the dielectric lens shown in Patent Literature 1 is employed for an antenna for a radar using a waveguide horn to increase the detection distance, the antenna can be downsized and a high gain can be obtained. However, the half-value width is narrowed due to the high gain. The enlargement of the detection angle range of the radar while maintaining the antenna high-gain characteristics can be realized by arranging the plural directional antennas to form multiple beams as shown in Patent Literature 2 and Patent Literature 3.

In Patent Literature 2, the antenna apparatus having multiple beams can be realized by arranging the plural directional antennas (rectangular opening plane waveguide horn antennas) obliquely in a specific orientation while sharing the rotational axis. In order to obtain the high-gain antenna characteristics in a desired orientation direction, the normal orientation of an opening plane needs to match the antenna radiation direction. Thus, the directional antenna itself needs to be inclined in the desired orientation. Therefore, the antenna opening planes cannot be formed on the same flat plane because the opening plane orientations of the directional antennas differ from each other, and thus it is difficult to downsize the antenna apparatus.

In Patent Literature 3, the directional antennas with different radiation ranges are arranged to realize two monitoring modes. In the case where the waveguide horn opening planes are regularly arranged in an array on the same flat plane to form multiple beams of the in-vehicle radar apparatus, the entire antenna can be downsized as small as possible. However, although the radiation ranges can be changed, the normal directions of the opening planes become necessarily the same. Thus, it is difficult to form multiple beams with different directivities.

In each of Patent Literature 4 and Patent Literature 5, the lens antenna is formed using the base part in which the waveguide is formed and the dielectric lens. An opening plane of the base part and a radiation plane of the dielectric lens are directed obliquely upward. In the case where radio waves radiated from the lens antenna are allowed to be radiated not in the downward direction as side lobes but only in the horizontal direction, it is necessary to form the radiation plane of the dielectric lens obliquely upward to horizontally set the radiation angle of the lens antenna using the Snell's law. Since the lower side of the base part projects further than the upper side thereof, the lens functions as a clutter plate.

In addition, as a result of forming the radiation plane obliquely upward, the radio wave propagating direction in the dielectric lens is directed obliquely downward by the S-shaped curved plane of the back surface of the dielectric lens. However, the lens radiation plane and the base part opening plane become the same or parallel to each other so that radio waves radiated from the lens radiation plane propagate only in the horizontal direction, and it is necessary to provide an inclined plane on the radiation side of the base part in which the waveguide is formed so that radio waves moving towards the lens radiation plane after being reflected at a lower portion of the base part from the inside of the dielectric lens do not propagate downward. In the case where the lens antennas are arranged in an array in the vertical and horizontal directions as a result of directing the base part opening plane obliquely upward, the antenna opening planes are positioned in a saw shape in the vertical direction, and thus the dielectric lens cannot be integrally formed. In addition, the lower portions of the base parts of the vertically-arranged lens antennas are generated on a plane ahead of the radiation plane of the lens, and thus there is a concern of a negative impact on antenna radiation characteristics due to diffraction of radio waves at an end of the base part.

Accordingly, it is necessary for a radar for automobiles to have an antenna that can generate multiple beams with different radiation orientations in order to expand the specifications of the maximum detection distance and the angle detection range.

Solution to Problem

The present invention provides an antenna comprising: a radiation unit that is formed on a substrate; a waveguide that propagates therein radio waves radiated from the radiation unit and radiates the radio waves as a beam; and a dielectric lens that is arranged in an opening of the waveguide and has an incident plane facing the radiation unit and a radiation plane radiating radio waves entered from the incident plane. The radiation plane of the dielectric lens has a plane orientation different from a flat plane perpendicular to the radiation direction of the beam.

Advantageous Effects of Invention

According to the present invention, it is possible to provide an antenna that can radiate a beam to a desired orientation in accordance with the plane orientation of a radiation plane and can generate multiple beams. Objects, configurations, and effects other than those described above will become apparent in the description of the following embodiments.

BRIEF DESCRIPTION OF DRAWINGS

FIGS. 1A to 1D show a first embodiment of the present invention, and are diagrams each showing a structure of a flat beam generation antenna.

FIGS. 8A to 8D show a third embodiment of the present invention, and are diagrams each showing a structure of a flat beam generation antenna.

FIGS. 11A to 11D show a fifth embodiment of the present invention, and are diagrams each showing a structure of a flat beam generation antenna.

DESCRIPTION OF EMBODIMENTS

Hereinafter, the best mode for carrying out the present invention will be described in detail on the basis of the drawings. It should be noted that members having the same functions are followed by the same signs in each drawing for explaining the best mode for carrying out the present invention, and the repeated explanation thereof will be omitted.

First Embodiment

FIG. 1 show a first embodiment of the present invention, and are diagrams each showing a structure of a flat beam generation antenna. In addition, FIG. 2A is a plan view of a dielectric substrate.

Figure 2A:
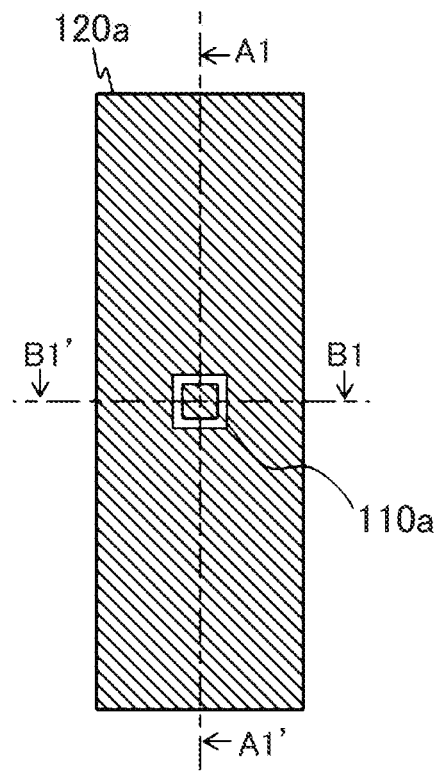
FIG. 2A shows the first embodiment of the present invention, and is a plan view of a dielectric substrate.

In the antenna shown in FIG. 1 and FIG. 2A, a first radiation unit 110a is formed in the central portion of a first plane (a plane on the right side in the drawing) of a dielectric substrate 100. In addition, a first conductor unit 120a is formed on the first plane of the dielectric substrate 100, and a second conductor unit 130a is formed on a second plane on the side opposite to the first plane of the dielectric substrate 100. In addition, a connection member 400a is provided to conduct a conductor of the first plane and a conductor of the second plane of the dielectric substrate 100.

A first horn 200a whose, at least, inner surface is formed using a conductor is attached to the first plane side of the dielectric substrate 100, and a first dielectric lens 300a having a lens curved plane the number of which is the same as that of radiation units is arranged around a radiation-side opening (the right side in the drawing) of the first horn (waveguide) 200a.

The first horn 200a is a waveguide, and is formed in a tapered shape to radiate radio waves. The cross section of the first horn 200a is monotonically enlarged from the proximal end on the first radiation unit 110a side towards the opening end where the first dielectric lens 300a is arranged.

The first dielectric lens 300a forms a curved plane in a convex shape on the side (the incident plane side) facing the first radiation unit 110a. A flat plane on the radiation plane side of the first dielectric lens 300a is an inclined plane 310a having a predetermined angle α with respect to an opening plane C1-C1' of the horn 200a. In other words, the radiation plane of the first dielectric lens 300a has a plane orientation different from the flat plane perpendicular to the radiation direction of radio waves (beams). It should be noted that the plane orientation is the normal direction of the radiation plane. A radar (a radar apparatus or a radar system) for automobiles has an inclined plane rotated with respect to the vertical axis in order to enlarge the viewing angle in the horizontal direction.

A first virtual line (a vertical central line) A1-A1' is a line that passes through the center of the radiation-side opening of the first horn 200a and has the shortest length, and a second virtual line (a horizontal central line) B1-B1' is a line that passes through the center of the first virtual line A1-A1' and is orthogonal to the first virtual line A1-A1'.

In the antenna of the first embodiment, one half of the first virtual line A1-A1' (namely, the length of one radiation-side opening in the A1-A1' direction) is longer than a second virtual line B1-B1'. That is, the radiation-side opening of the first horn 200a in the embodiment has a rectangular shape in which the direction (the vertical direction) of the first virtual line A1-A1' is longer than the direction (the horizontal direction) of the second virtual line B1-B1'.

(A) of FIG. 1 shows the shape of the antenna of the first embodiment when being viewed from the radiation-side opening side of the first horn 200a. In addition, (B) of FIG. 1 shows the cross-sectional shape of the antenna of the first embodiment along the first virtual line A1-A1'. In addition, (C) of FIG. 1 shows the cross-sectional shape of the antenna of the first embodiment along a third virtual line B1-B1'. (D) of FIG. 1 shows an inner surface of the horn 200a when being overlooked from the radiation-side opening side of the first horn 200a.

FIG. 2A shows the shape of the dielectric substrate 100 when being viewed from the side of a first plane (a first conductor unit 120a). In the first plane of the dielectric substrate 100, the first conductor unit 120a has a penetrating part formed so as to surround the first radiation unit 110a while being separated from the first radiation unit 110a by a fixed distance.

The first conductor unit 120a is electrically connected to a second conductor unit 130a formed on a second plane of the dielectric substrate 100 through the connection member 400a. Accordingly, each of the first conductor unit 120a and the second conductor unit 130a functions as a reference potential plane of the first radiation unit 110a. The first radiation unit 110a functions as a patch antenna, and radiates radio waves from the first plane side of the dielectric substrate 100. It should be noted that each of the intervals at which the connection members 400a are arranged is desirably shorter than one-fourth of the wavelength of radio waves used in the dielectric substrate 100.

Figure 2B:
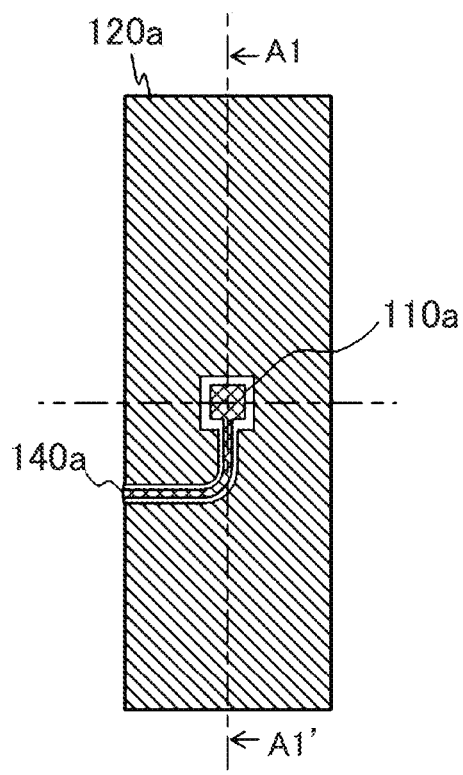
FIG. 2B shows the first embodiment of the present invention, and is a plan view of the dielectric substrate.

FIG. 2B is a diagram for showing the dielectric substrate 100 in the case where the first radiation unit 110a is provided with a feeder. The diagram shows the shape of the first radiation unit 110a when being viewed from the side of the first plane (the first conductor unit 120a) as similar to FIG. 2A.

In the antenna shown in FIG. 2B, the first radiation unit 110a is connected to a first feeder line 140a. The first conductor unit 120a has a penetrating part formed so as to surround the first radiation unit 110a while being separated from the first radiation unit 110a and the first feeder line 140a by a fixed distance. In such a structure, energy of radio waves to be radiated is supplied to the first radiation unit 110a through the first feeder line 140a.

A radiation source-side opening located on the side opposite to the radiation-side opening of the first horn 200a in the radio wave travelling direction is connected to the first plane (the first conductor unit 120a) side of the dielectric substrate 100 so as to include the first radiation unit 110a, and the first radiation unit 110a is arranged at a position that nearly matches the focal position of the lens curved plane of the first dielectric lens 300a.

Further, if the first dielectric lens 300a having the lens curved plane is formed in a convex shape in the direction (the incident plane side) of the radiation source-side opening, the length from the radiation source-side opening (the first conductor unit 120a side) of the first horn 200a to the radiation-side opening can be shortened so that the radio wave phases can be approximately parallel to each other in a C1-C1' cross section (see FIG. 1) corresponding to the opening plane of the first horn 200a, and the antenna can be downsized.

The convex plane of the first dielectric lens 300a can be formed of a curved plane using a hyperbolic function in the A1-A1' direction (see FIG. 1) so that the radio wave phases can be parallel to each other in a C1-C1' cross section corresponding to the opening plane of the first horn 200a. The convex plane of the first dielectric lens 300a is formed of a curved plane using the hyperbolic function also in the B1-B1' direction (see FIG. 1) so that the radio wave phase planes can be parallel to each other in a C1-C1' cross section.

Since the first horn 200a generates a flat beam spreading in the horizontal direction, the inclined angle from the first radiation unit 110a to the opening plane C1-C1' of the first horn 200a in the B1-B1' direction is smaller than that in the A1-A1' direction due to the vertical/horizontal aspect ratio of the rectangular opening plane.

The convex plane of the first dielectric lens 300a may be a curved plane using a rotation hyperbolic function on the assumption that an intersection point between A1-A1' and B1-B1' that is the optical axis of the lens is an axis. However, in order to secure the thickness of the lens at the corner part of the waveguide opening plane, the coefficients of the hyperbolic functions of the curved plane in the A1-A1' direction and the B1-B1' direction may be different from each other.

In addition, in the case where a spherical wave propagating in the first horn 200a is narrow (for example, 40 degrees or smaller) in the inclined angle in the B1-B1' direction and the spherical wave phase plane in the B1-B1' direction is approximately flat, the convex plane of the first dielectric lens 300a may be a cylindrical curved plane that is a curved plane on which the hyperbolic function is satisfied only in the A1-A1' direction.

It should be noted that the refraction action in the first dielectric lens 300a can be handled as similar to light that is an electromagnetic wave whose wavelength is short in the first embodiment, and thus the axis in the travelling direction of the first dielectric lens 300a is handled as an optical axis.

Next, functions of the antenna of the first embodiment will be described. Radio waves radiated from the first radiation unit 110a propagate in the first horn 200a, and are radiated to space after penetrating the first dielectric lens 300a.

Radio waves in a semispherical plane shape are radiated from the first radiation unit 110a formed in a patch antenna shape, pass through tapered space of the inner surface of the first horn 200a while keeping the spherical plane shape, and the spherical waves are converted into flat plane waves by the convex plane on the incident plane side of the first dielectric lens 300a.

The radio waves in the opening plane C1-C1' of the first horn 200a propagate perpendicular to the opening plane C1-C1' because the radio waves are converted into flat plane waves by the convex plane shape of the incident plane of the first dielectric lens 300a.

Thus, in the case where the normal direction of the inclined plane 310a as the radiation plane of the dielectric lens 300a corresponds to the angle α (see FIG. 1), the radio waves are radiated to the angle orientation corresponding to $(n-1) \times \alpha$ (n: refractive index $n=(er)^{1/2}$ obtained on the basis of the dielectric constant of the dielectric lens) of the radio wave propagating direction radiated from the dielectric lens inclined plane according to the Snell's law.

Figure 3A:
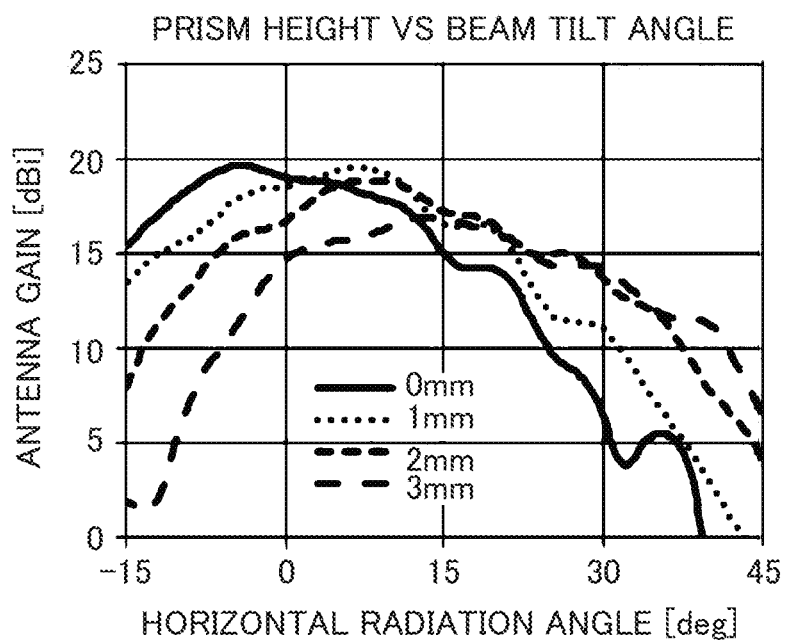
FIG. 3A shows the first embodiment of the present invention, and is a graph for showing an analysis result of radiation characteristics of the flat beam generation antenna.
Figure 3B:
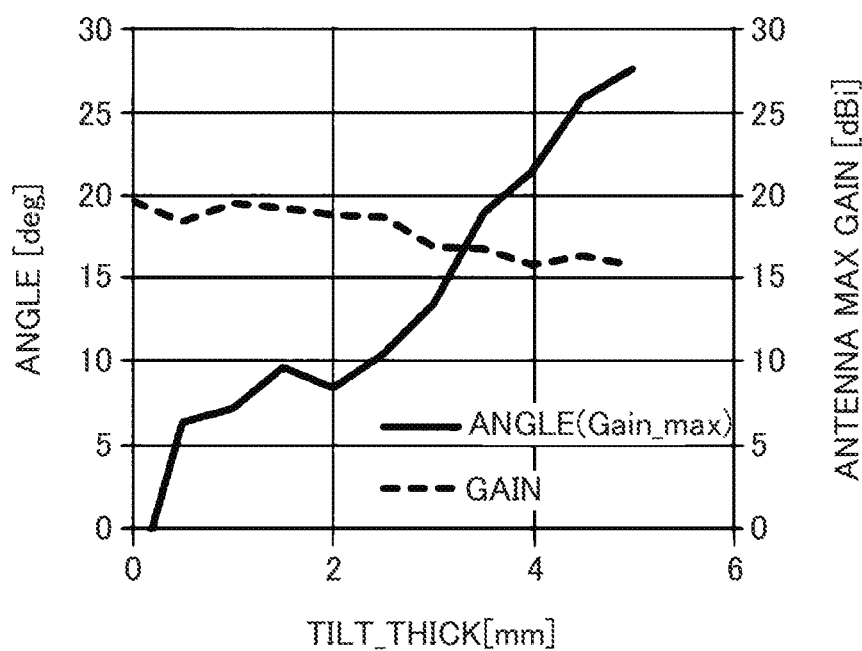
FIG. 3B shows the first embodiment of the present invention, and is a graph for showing an analysis result of the maximum gain and radiation angle in a prism structure of the flat beam generation antenna.

A graph of radiation characteristics obtained by performing an electromagnetic field analysis for the antenna of the first embodiment is shown in FIG. 3A, and an example of an orientation angle where the maximum antenna gain value and the maximum gain can be obtained is shown in FIG. 3B. A prism having a triangular cross section surrounded by the horn opening plane C1-C1' and the radiation plane D1-D1' of the dielectric lens 300a is formed by the angle α of the inclined plane.

The height of the prism corresponds to a value obtained by multiplying the virtual line B1-B1' (see FIG. 1) by tan (α). When the height of the prism is 0 mm (the angle α=0 degree), the opening plane is equal to the normal direction of the lens radiation inclined plane. Thus, antenna radiation characteristics can be obtained so that the maximum gain value can be obtained around a radiation angle orientation of 0 degree.

As shown in FIG. 3B, the inclined plane D1-D1' is allowed to have the angle α to increase the height of the prism, so that the radiation angle orientation where the maximum gain value can be obtained is shifted to a wide angle direction. When the height of the prism is 3 mm, antenna characteristics can be obtained so that the gain is maximized at a radiation angle orientation of 15 degrees. As the antenna gain maximum angle is shifted to a wide angle direction, the maximum antenna gain value is reduced, but the antenna half-value width is enlarged. This is because radio waves are leaked and radiated from the C1'-D1' side surface of the prism shape. As a result, when the height of the prism is 2 mm, the antenna gain maximum angle is 8 degrees, and a gain improvement of about 8 dB can be obtained at a radiation angle orientation of 30 degrees.

The radiation plane inclined plane D1-D1' of the dielectric lens 300a may be designed to have the angle α with respect to the horn opening plane C1-C1', and a trapezoid shape in which the side on the C1-D1 side has a finite value may be employed.

Figure 4A:
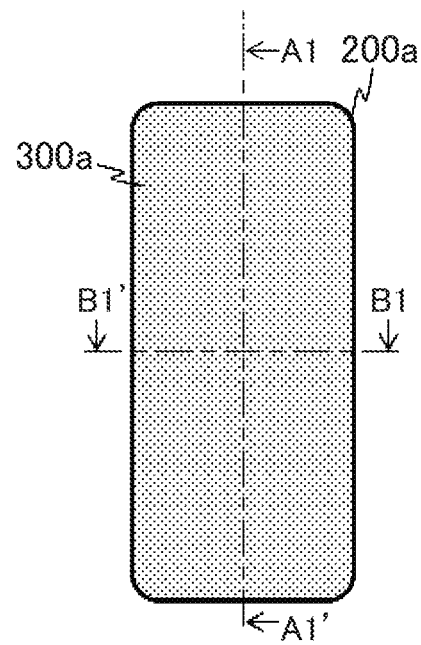
FIG. 4A shows the first embodiment of the present invention, and is a diagram for showing a structure of the flat beam generation antenna.
Figure 4B:
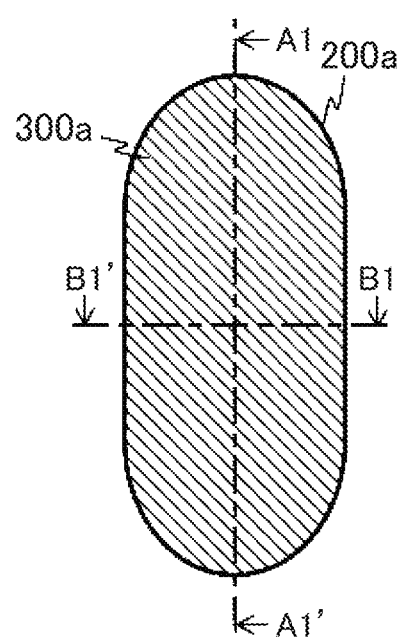
FIG. 4B shows the first embodiment of the present invention, and is a diagram for showing a structure of the flat beam generation antenna.

Each of FIG. 4A and FIG. 4B shows the shape of the first horn 200a when being viewed from the radiation-side opening side. In the flat beam generation array antenna shown in FIG. 1, the shape of the radiation-side opening of the first horn 200a is formed using four linear sides.

In the antenna shown in FIG. 4A, the shape of the radiation-side opening of the first horn 200a is formed so that the direction of the first virtual line A1-A1' is longer than that of the third virtual line B1-B1' and four corners are formed in a curved shape (a quadrangle with round corners).

In addition, in the antenna shown in FIG. 4B, the shape of the radiation-side opening of the first horn 200a is formed in an elliptical shape in which the long sides in the direction of the first virtual line A1-A1' are longer than the short sides in the direction of the third virtual line B1-B1'.

As the shape of the radiation-side opening of the first horn 200a of the antenna according to the present invention, the rectangular shape shown in FIG. 1 or the shape including the curved parts shown in each of FIG. 4A and FIG. 4B may be selected in accordance with easiness in manufacturing and radiation patterns of the flat beam to be generated.

As described above, the inclined plane 310a as the radiation plane of the dielectric lens 300a has a plane orientation (the normal direction of a plane) different from the flat plane orthogonal to the radiation direction of radio waves (beams) in the first embodiment, so that the radio waves can be radiated to a desired radiation direction. In addition, the inclined plane 310a as the radiation plane is inclined by a predetermined angle with respect to a plane perpendicular (orthogonal) to the radiation direction of the radio waves at a predetermined position on the radiation direction side of the radio waves with respect to the opening plane of the first horn 200a, so that the radio waves can be radiated at a desired angle. Multiple beams in different radiation directions (orientations) can be generated by arranging a plurality of antennas of the first embodiment to differentiate the direction of the inclined plane 310a.

Second Embodiment

Figure 5A:
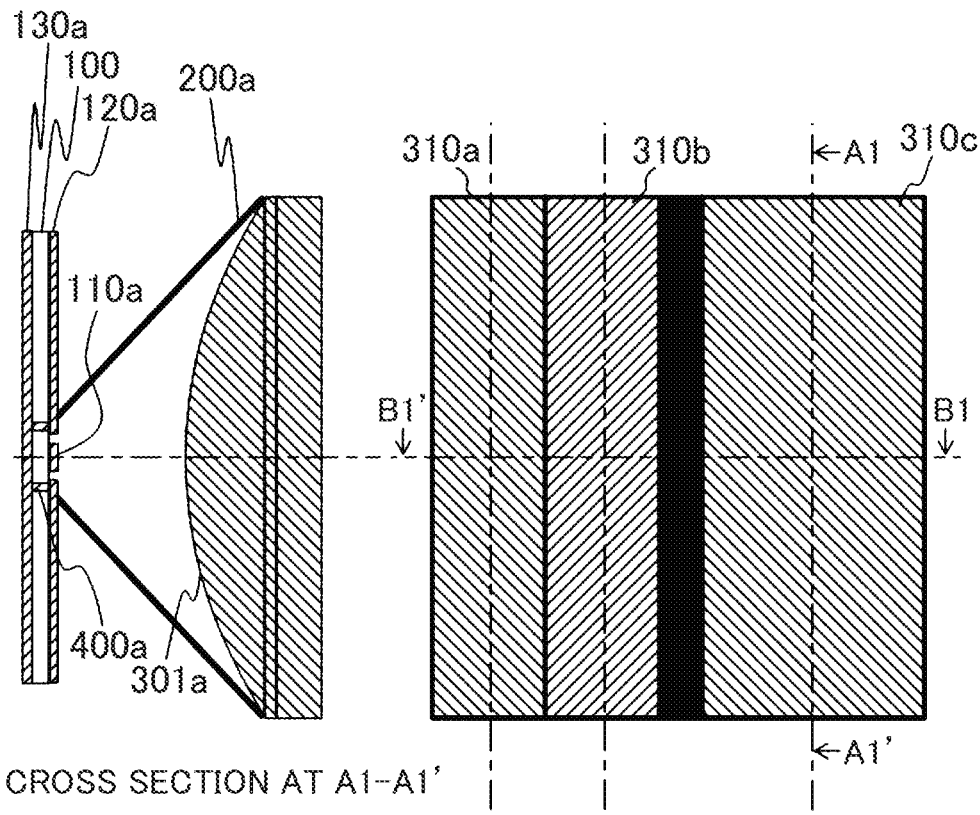
FIGS. 5A and 5B show a second embodiment of the present invention, and are diagrams each showing a structure of a flat beam generation antenna.
Figure 5B:
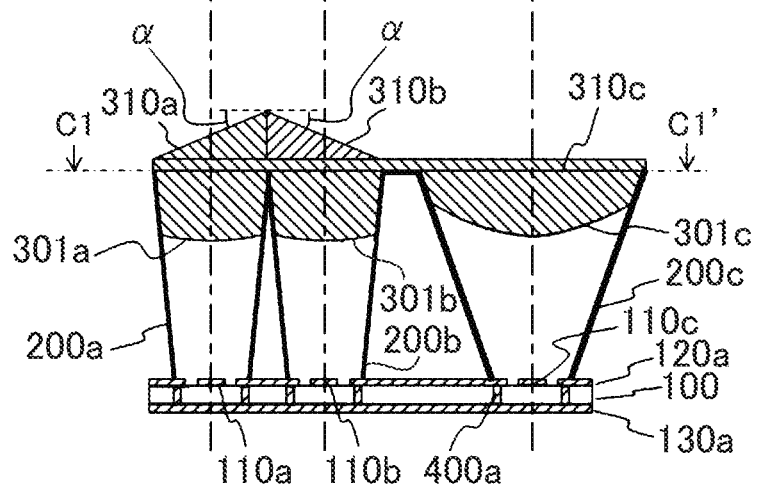

FIG. 5 are structure diagrams of a flat beam generation horn antenna according to a second embodiment of the present invention. In the antenna shown in FIG. 5, a first radiation unit 110a, a second radiation unit 110b, and a third radiation unit 110c are formed on a first plane of a dielectric substrate 100.

A first conductor unit 120a is formed on the first plane of the dielectric substrate 100, and a second conductor unit 130a is formed on a second plane on the side opposite to the first plane of the dielectric substrate 100. In addition, a connection member 400a is formed to conduct a conductor of the first plane and a conductor of the second plane of the dielectric substrate 100. A first horn 200a, a second horn 200b, and a third horn 200c whose, at least, inner surfaces are formed using a conductor are attached to the first plane side of the dielectric substrate 100. A first dielectric lens 301a, a second dielectric lens 301b, and a third dielectric lens 301c having lens curved planes the number of which is the same as that of radiation units are arranged around radiation-side openings of the horns 200a to 200c, respectively.

The first horn 200a is a waveguide, and is formed in a tapered shape to radiate radio waves. The second horn 200b and the third horn 200c are similarly waveguides formed in a tapered shape to radiate radio waves.

The first dielectric lens 301a forms a convex plane shape facing the radiation unit in the direction on the radiation unit side (the incident plane side). On the radiation plane side of the first dielectric lens 301a, provided is an inclined plane 310a having a predetermined angle α different from the normal direction of an opening plane C1-C1' of the first horn 200a. It should be noted that the convex plane shapes on the incident plane sides of the first dielectric lens 301a to the third dielectric lens 301c are the same as those in the first embodiment.

The second dielectric lens 301b forms a convex plane shape facing the radiation unit in the direction on the radiation unit side (the incident plane side). On the radiation plane side of the second dielectric lens 301b, provided is an inclined plane 310b having a predetermined angle α different from the normal direction of an opening plane C1-C1' of the second horn 200b.

The third dielectric lens 301c forms a convex plane shape facing the radiation unit in the direction on the radiation unit side (the incident plane side). On the radiation plane side of the third dielectric lens 301c, provided is a flat plane 310c parallel to an opening plane C1-C1' of the third horn 200c.

Next, functions of the antenna of the second embodiment will be described. Radio waves radiated from the first radiation unit 110a propagate in the first horn 200a, and are radiated from the inclined plane 310a of the dielectric lens to space after penetrating the first dielectric lens 301a.

Radio waves radiated from the second radiation unit 110b propagate in the second horn 200b, and are radiated from the inclined plane 310b of the second dielectric lens 301b to space after penetrating the second dielectric lens 301b.

Radio waves radiated from the third radiation unit 110c propagate in the third horn 200c, and are radiated from a plane parallel to an opening plane C1-C1' of the third horn 200c of the third dielectric lens 301c to space after penetrating the third dielectric lens 301c. The phases of the radio waves in a spherical plane shape radiated from the first to third radiation units 110a, 110b, and 110c are adjusted to flat plane waves by the dielectric lenses in a convex shape provided in the opening planes of the first horn 200a, the second horn 200b, and the third horn 200c, and propagate perpendicular to the flat plane C1-C1' of the opening plane of the horn 200.

Figure 6A:
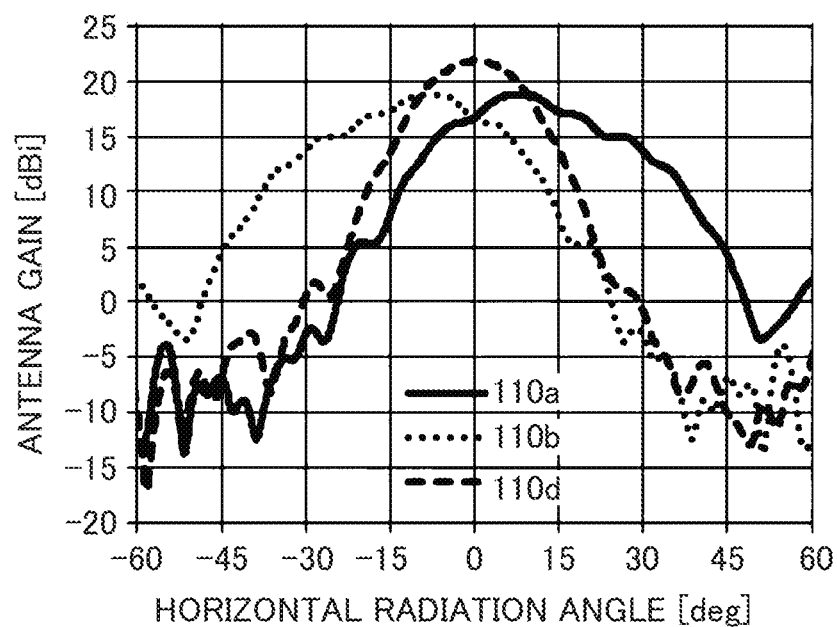
FIG. 6A shows the second embodiment of the present invention, and is a graph for showing an analysis result of radiation characteristics of the flat beam generation antenna.
Figure 6B:
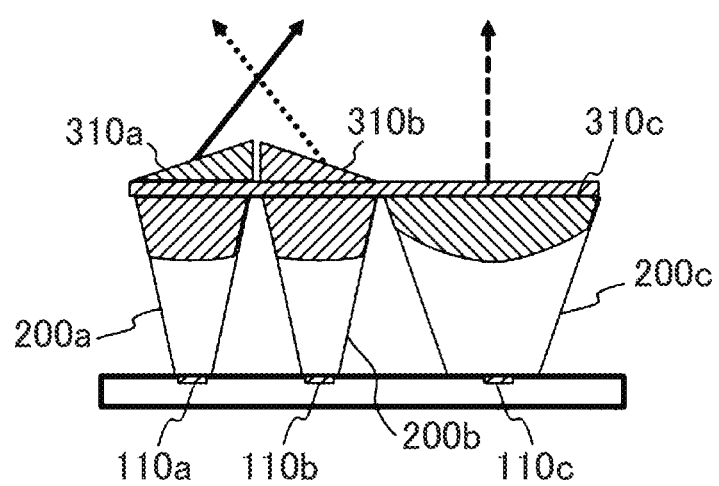
FIG. 6B shows the second embodiment of the present invention, and is a diagram for showing radiation directions of the flat beam generation antenna.

As shown in FIG. 6B, the radio waves from the first radiation unit 110a passing through the inclined plane 310a inclined upward to the right in the drawing is refracted to the right direction, the radio waves from the second radiation unit 110b passing through the inclined plane 310b inclined upward to the left is refracted to the left direction, and the radio waves from the third radiation unit 110c are perpendicularly radiated from a plane parallel to the flat plane C1-C1' of the opening plane of the dielectric lens.

A graph of radiation characteristics obtained by performing an electromagnetic field analysis for the antenna of the second embodiment shown in FIG. 5 is shown in FIG. 6A. The radio waves radiated from the first radiation unit 110a exhibit an antenna radiation characteristic with a maximum gain angle orientation of +8 degrees, the radio waves from the second radiation unit 110b exhibit an antenna radiation characteristic with a maximum gain angle orientation of −8 degree, and the radio waves from the third radiation unit 110c exhibit an antenna radiation characteristic with a maximum gain angle orientation of 0 degree.

In particular, in order to realize a maximum detection distance of 250 m or longer by a radar in the front direction for the radio waves radiated from the third radiation unit 110c, the size of the opening plane of the third horn 200c may be enlarged larger than those of the first horn 200a and the second horn 200b.

In the antenna configured using three radiation units 110, three horns 200, and three dielectric lenses 300a formed on the dielectric substrate 100, multi-beam characteristics having three directionalities are provided, the antenna gain in angle orientations of ±30 degrees is improved by 13 dB or more as compared to antenna radiation characteristics in an angle orientation of 0 degree by the radiation unit 100c, and the antenna contributes to enlargement of the detection distance of the radar in the front direction and the wide angle direction.

In the antenna configuration shown in the second embodiment, the opening plane of each waveguide configured in each horn 200 is unified on the flat plane C1-C1'. Thus, the dielectric lenses provided with plural convex planes and inclined planes can be realized to be thin and downsized by easy processing means such as injection molding. In addition, as a result of unifying the opening plane of each waveguide on the flat plane C1-C1', diffraction hardly occurs because there is no unnecessary conductive projection, and thus it is possible to reduce the influence on the antenna radiation characteristics from the radiation units that are adjacent to each other.

Figure 7:
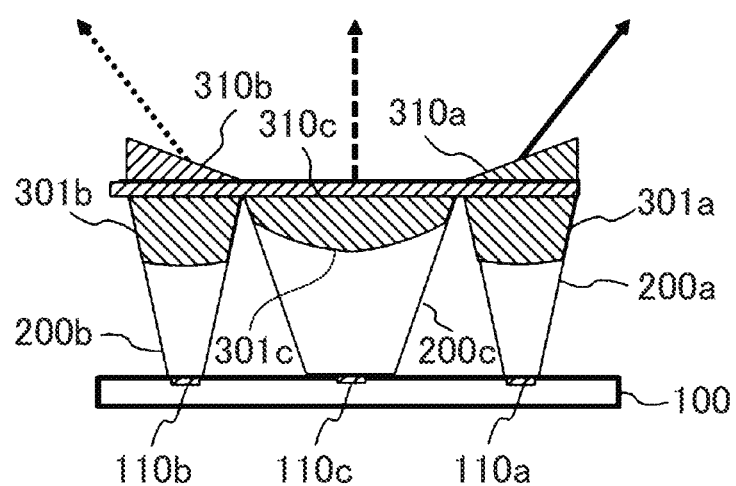
FIG. 7 shows a modified example of the second embodiment of the present invention, and is a diagram for showing a structure of a flat beam generation antenna.

FIG. 7 shows a second antenna configuration to realize the second embodiment. In the antenna shown in FIG. 7, a first radiation unit 110a, a second radiation unit 110b, and a third radiation unit 110c are formed on a first plane of a dielectric substrate 100.

The second radiation unit 110b, the third radiation unit 110c, and the first radiation unit 110a are arranged from the left in the drawing, and a second horn 200b, a third horn 200c, and a first horn 200a whose, at least, inner surfaces are formed using a conductor are arranged from the left on the first plane side of the dielectric substrate 100.

A second dielectric lens 301b having a convex lens curved plane the number of which is the same as that of radiation units is arranged around a radiation-side opening of the second horn 200b. On the radiation plane side of the second dielectric lens 301b, provided is an inclined plane 310b having a predetermined angle α different from the normal direction of an opening plane C1-C1' of the second horn 200b.

A third dielectric lens 301c having a convex lens curved plane the number of which is the same as that of radiation units is arranged around a radiation-side opening of the third horn 200c located in the middle. On the radiation plane side of the third dielectric lens 301c, provided is a flat plane 310c parallel to an opening plane C1-C1' of the third horn 200c.

A first dielectric lens 301a having a convex lens curved plane the number of which is the same as that of radiation units is arranged around a radiation-side opening of the first horn 200a located on the right side of the drawing. On the radiation plane side of the first dielectric lens 301a, provided is an inclined plane 310a having a predetermined angle α different from the normal direction of an opening plane C1-C1' of the first horn 200a.

If the influence of the adjacent radiation units on the antenna radiation characteristics due to the inclined plane 310a of the first dielectric lens 301a and the prism shape of the second dielectric lens 301b is small, the antenna arrangement shown in FIG. 7 may be employed.

It should be noted that an example of division into three dielectric lenses 301a to 301c is shown above, but the first dielectric lens 301a, the second dielectric lens 301b, and the third dielectric lens 301c can be integrally formed.

In the second embodiment as described above, the radiation plane of the first dielectric lens 301a is formed using the inclined plane 310a having the predetermined angle α different from the normal direction (the flat plane perpendicular to the radiation direction of the beam) of the opening plane C1-C1' of the first horn 200a, the radiation plane of the second dielectric lens 301b is formed using the inclined plane 310ba having the predetermined angle α different from the normal direction (the flat plane perpendicular to the radiation direction of the beam) of the opening plane C1-C1' of the first horn 200a and the plane orientation of which is different from that of the inclined plane 310a, and the radiation plane of the third dielectric lens 301c is formed using the flat plane 310c parallel to the opening plane C1-C1' of the first horn 200a.

In addition, a high-gain antenna in which multiple beams in different radiation orientations can be generated can be manufactured and downsized at low cost by aligning the opening planes of the first to third horns 200a to 200c on the same flat plane.

Third Embodiment

FIG. 8 are structure diagrams of a flat beam generation horn antenna according to a second embodiment of the present invention. In the antenna shown in FIG. 8, a first radiation unit 110a and a second radiation unit 110b are formed on a first plane of a dielectric substrate 100.

In addition, a first conductor unit 120a is formed on the first plane of the dielectric substrate 100, and a second conductor unit 130a is formed on a second plane on the side opposite to the first plane of the dielectric substrate 100. In addition, the first conductor unit 120a is electrically connected to the second conductor unit 130a formed on the second plane of the dielectric substrate 100 through a connection member 400a.

Accordingly, the first conductor unit 120a and the second conductor unit 130a function as reference potential planes of a first radiation unit 110a and a second radiation unit 110b, and the first radiation unit 110a and the second radiation unit 110b function as patch antennas to radiate radio waves from the first plane side of the dielectric substrate 100.

A first horn 200d whose, at least, inner surface is formed using a conductor is attached to the first plane side of the dielectric substrate 100, and a first dielectric lens 300b having a lens curved plane is arranged around a radiation-side opening of the first horn 200d.

The first horn 200d is a waveguide, and is formed in a shape including two tapers to radiate radio waves from the two radiation units. On the radiation source side of the first horn 200d, provided are a first opening surrounding the first radiation unit 110a and a second opening surrounding the second radiation unit 110b, and a radiation-side opening has one opening to which the first dielectric lens 300b is attached. It should be noted that a projection part 200e is formed between the first radiation unit 110a and the second radiation unit 110b as will be described later, and two horns enlarged towards the radiation side are formed inside the first horn 200d.

The first dielectric lens 300b forms a convex plane shape the number of which is the same as that of radiation units in the direction on the first radiation unit 110a side (the incident plane side). A flat plane on the radiation plane side of the first dielectric lens 300b is an inclined plane 310a having a predetermined angle α different from the normal direction of an opening plane C1-C1' of the horn 200d.

The first dielectric lens 300b has a first lens curved plane 302a having a curved plane formed in a convex shape towards the first radiation unit 110a and a second lens curved plane 302b having a curved plane formed in a convex shape towards the second radiation unit 110b.

The optical axis of the first lens curved plane 302a can be set on the same axis as the normal passing through the center of the first radiation unit 110a serving as the first plane, and corresponds to, for example, F1a-F1a' in the drawing. The optical axis of the second lens curved plane 302b can be set on the same axis as the normal passing through the center of the second radiation unit 110b serving as the first plane, and corresponds to, for example, F1b-F1b' in the drawing.

The antenna of the third embodiment having such a configuration radiates radio waves substantially parallel to the optical axis F1a-F1a' of the first lens curved plane 302a of the first dielectric lens 300b and the optical axis F1b-F1b' of the second lens curved plane 302b.

A first virtual line (a vertical central line) A1-A1' is a line that passes through the center of the radiation-side opening of the first horn 200d and has the shortest length, and a second virtual line (a horizontal central line) B1-B1' is a line that passes through the center of the first virtual line A1-A1' and is orthogonal to the first virtual line A1-A1'.

A third virtual line E1a-E1a' is a line that passes through an intersection point between the first virtual line A1-A1' and the optical axis F1a-F1a' of the first lens curved plane 302a and is orthogonal to the first virtual line A1-A1'. A fourth virtual line E1b-E1b' is a line that passes through an intersection point between the first virtual line A1-A1' and the optical axis F1b-F1b' of the second lens curved plane 302b and is orthogonal to the first virtual line A1-A1'.

(A) of FIG. 8 shows the shape of the antenna of the third embodiment when being viewed from the radiation-side opening side of the first horn 200d. In addition, (B) of FIG. 8 shows the cross-sectional shape of the antenna of the third embodiment along the first virtual line A1-A1'. In addition, (C) of FIG. 8 shows the cross-sectional shape of the antenna of the third embodiment along the third virtual line E1b-E1b'. (D) of FIG. 8 shows an inner surface of the horn 200d when being overlooked from the antenna opening side.

In the first horn 200d, arranged is the projection part 200e having a plane linearly symmetrical with the inner surface of the metal horn with respect to the optical axis F1a-F1a' of the first lens curved plane 302a and the optical axis F1b-F1b' of the second lens curved plane 302b.

The first horn 200d has a horn shape symmetrical with the second virtual line B1-B1' as the optical axis by arranging the projection part 200e. The antenna of the third embodiment is configured using the first radiation unit 110a, the second radiation unit 110b, the first horn 200d, and the projection part 200e.

The potential of the first horn 200d and the projection part 200e can be equal to the reference potential of the radiation units by electrically connecting the first horn 200d to the projection part 200e through the first conductor unit 120a. Thus, the radio waves radiated from the first radiation unit 110a and the second radiation unit 110b can be efficiently transmitted to the first horn 200d.

Further, convex shapes are formed in the direction of the radiation source-side opening in the first dielectric lens 300b having a plurality of lens curved planes, so that the length from the radiation source-side opening of the first horn 200d to the radiation-side opening can be reduced, and the antenna can be downsized. The first radiation unit 110a and the second radiation unit 110b are arranged at positions roughly matching the focal position of each lens curved plane of the first dielectric lens 300b.

In the case where two radiation units are configured in the above-described structure, two lens curved planes (302a and 302b) are included in the direction (the vertical direction) of the first virtual line A1-A1' of the first horn 200d. Thus, the diameter of the lens curved plane covered by one lens curved plane is only the half of the opening size, and the focal distance necessary for the lens curved plane becomes about a half. Accordingly, downsizing of the antenna can be promoted.

Next, functions of the antenna of the third embodiment will be described. Radio waves radiated from the first radiation unit 110a propagate in the first horn 200d, and are radiated to space on the radiation side after penetrating the first lens curved plane 302a and the second lens curved plane 302b of the first dielectric lens 300b.

Radio waves in a semispherical plane shape are radiated from each of the first radiation unit 110a and the second radiation unit 110b formed in a patch antenna shape, pass through tapered space configured using the inner surface of the projection part 200e that is a plane symmetrical with the inner surface of the first horn 200d with respect to two optical axis F1a-F1a' and optical axis F1b-F1b' of the first dielectric lens 300b while keeping the spherical plane shape, and the spherical waves are converted into flat plane waves by the first lens curved plane 302a and the second lens curved plane 302b.

The radio waves radiated from the antenna opening plane for automobiles are required to distribute the electric power intensively to the center part of the opening plane in order to suppress unnecessary radiation. If the height of the projection part 200e is set equal to the opening of the first horn 200d, a notch occurs in radio wave intensity on the first virtual line A1-A1' that is the center of the antenna opening plane because the radio wave intensity is weak at a tip end of the projection part 200e.

The peak of the radio wave intensity is divided into two at the boundary of the virtual line B1-B1' shown in the drawing. Thus, the electric power distribution of the opening plane cannot be like the Talor line-source, and causes an increase in unnecessary radiation in the antenna radiation characteristics.

If the height of the projection part 200e is set lower than the opening of the first horn 200d on the radiation source side, radio waves are diffracted at a tip end of the projection part 200e before entering the first dielectric lens 300b. If the height of the projection part 200e is set lower than the opening of the first horn 200d on the radiation source side, the radio wave intensity on the virtual line B1-B1' is compensated by diffraction. Accordingly, the spherical waves from two radiation units 110a and 110b are spatially synthesized before the first dielectric lens 300b, radio wave vectors cancel the opposite radio wave vectors on the virtual line B1-B1', and the radio wave vectors in the direction same as the optical axis of the lens curved plane are synthesized.

The electric power distribution such as the Talor line-source in which the radio wave intensity is peaked at the center of the opening plane in the opening of the first horn 200d can be generated by adjusting the height (the retreat amount from the opening plane of the first horn 200d) of the projection part 200e, the relative distance between two radiation units 110a and 110b, and the taper angle of the horn shape of the first horn 200d and the projection part 200e.

The radio waves on the opening plane C1-C1' of the horn 200d propagate in the direction perpendicular to the opening plane C1-C1' because the radio waves are converted into flat plane waves by the convex plane shapes of the incident planes (the lens curved planes 302a and 302b) of the dielectric lens 300b.

Thus, in the case where the normal direction of the radiation plane inclined plane (310a) of the dielectric lens 300b is an angle α, the radio waves are radiated to the angle orientation corresponding to (n−1)×α of the radio wave propagating direction radiated from the dielectric lens inclined plane according to the Snell's law (n: refractive index n=(er)½ obtained on the basis of the dielectric constant of the dielectric lens).

The antenna of the third embodiment having such functions can suppress unnecessary radiation while reducing the antenna size and can radiate a flat beam whose width in the direction (the horizontal direction) of the second virtual line B1-B1' is wider than that in the direction (the vertical direction) of the first virtual line A1-A1' to the desired orientation (the angle orientation corresponding to (n−1)×α of the radio wave propagating direction).

It should be noted that the electric field plane direction (E-plane direction) of the radio waves radiated from the first radiation unit 110a and the second radiation unit 110b is arranged parallel to the first virtual line A1-A1', so that the shape of the beam radiated from the first horn 200d can be easily narrowed in the direction of the first virtual line A1-A1', and a desired beam shape as an antenna mounted in vehicles such as automobiles can be obtained.

Fourth Embodiment

Figure 9:
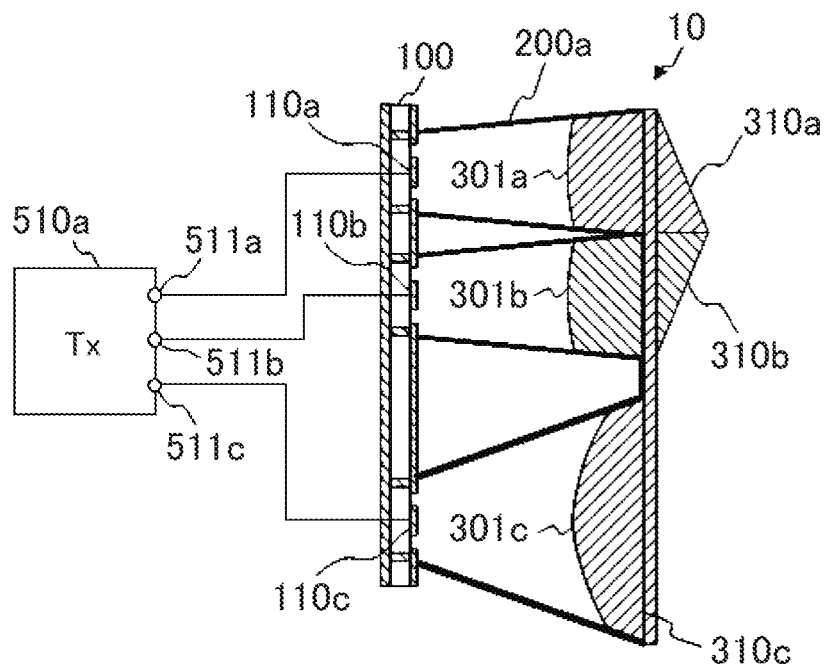
FIG. 9 shows a fourth embodiment of the present invention, and is a block diagram for showing a configuration of a flat beam generation antenna on the transmission side.

FIG. 9 shows a fourth embodiment, and is a block diagram for showing a configuration of a flat beam generation antenna on the transmission side. FIG. 9 is a block diagram of a radar having the flat beam generation array antenna shown in the above-described second embodiment on the transmission side. In the fourth embodiment, an example of a radar apparatus on the transmission side in which electricity is fed to the flat beam generation array antenna through a transmission circuit will be described.

The block diagram of the radar on the transmission side shown in FIG. 9 has a flat beam generation array antenna 10 and a first transmission circuit 510a. The first transmission circuit 510a has a first terminal 511a to which a first radiation unit 110a is connected, a second terminal 511b to which a second radiation unit 110b is connected, and a third terminal 511c to which a third radiation unit 110c is connected.

As similar to the second embodiment, the flat beam generation array antenna 10 has three dielectric lenses (301a to 301c) that deflect radio waves of the first radiation unit 110a to the third radiation unit 110c, and the radiation planes of the dielectric lenses are denoted by 310a to 310c in the drawing.

Next, functions of a transmission unit of the radar according to the fourth embodiment will be described. A signal output from the first terminal 511a of the first transmission circuit 510a is input to the first radiation unit 110a, and is radiated as radio waves from an inclined plane 310a of the first dielectric lens 301a.

Likewise, a signal output from the second terminal 511b of the first transmission circuit 510a is input to the second radiation unit 110b, and is radiated as radio waves from an inclined plane 310b of the second dielectric lens 301b.

A signal output from the third terminal 511c of the first transmission circuit 510a is input to the third radiation unit 110c, and radio waves from the third radiation unit 110c are perpendicularly radiated from a flat plane 310c parallel to an opening plane flat plane C1-C1' of the third dielectric lens 301c.

The transmission unit of the radar having the flat beam generation array antenna of the fourth embodiment can be applied to a radar that measures a distance to an obstacle or the like or the relative speed of an obstacle or the like by exclusively radiating radio waves from one of the first to third radiation units 110a, radiation units 110b, and radiation units 110c or by radiating radio waves from two or more radiation units.

Figure 10:
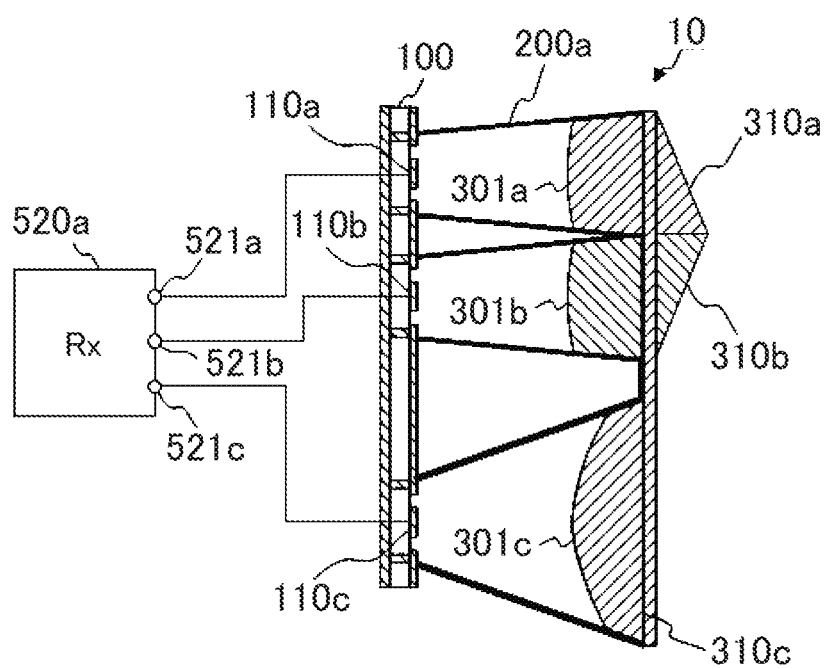
FIG. 10 shows the fourth embodiment of the present invention, and is a block diagram for showing a configuration of the flat beam generation antenna on the reception side.

FIG. 10 is a reception-side block diagram of a radar having the flat beam generation array antenna according to the above-described second embodiment. A flat beam generation array antenna 10 and a first reception circuit 520a are provided. The first reception circuit 520a has a first terminal 521a to which a first radiation unit 110a is connected, a second terminal 521b to which a second radiation unit 110b is connected, and a third terminal 521c to which a third radiation unit 110c is connected.

Next, functions of a reception unit of the radar according to the fourth embodiment will be described. Radio waves entered from the inclined plane 310a of the first dielectric lens 301a are output as a signal by the first radiation unit 110a, and are input to the first terminal 521a of the first reception circuit 520a.

Likewise, radio waves entered from the inclined plane 310b of the second dielectric lens 301b are output as a signal by the second radiation unit 110b, and are input to the second terminal 521b of the first reception circuit 520a.

Radio waves perpendicularly entered from the flat plane 310c parallel to the flat plane C1-C1' of the opening plane of the third dielectric lens 301c are output as a signal by the third radiation unit 110c, and are input to the third terminal 521c of the first reception circuit 520a.

The reception unit of the sensor having the flat beam generation array antenna of the fourth embodiment can be applied to a radar apparatus or a radar system that measures a distance to an obstacle or the like or the relative speed of an obstacle or the like by entering radio waves from the first to third radiation unit 110a, radiation unit 110b, and radiation unit 110c.

Fifth Embodiment

FIG. 11 show a fifth embodiment of the present invention, and are diagrams each showing a structure of a flat beam generation horn antenna.

In the antenna shown in FIG. 11, a first radiation unit 110a is formed on a first plane of a dielectric substrate 100. In addition, a first conductor unit 120a is formed on the first plane of the dielectric substrate 100, and a second conductor unit 130a is formed on a second plane on the side opposite to the first plane of the dielectric substrate 100.

In addition, a connection member 400a is formed to conduct a conductor of the first plane and a conductor of the second plane of the dielectric substrate 100. A first horn 200a whose, at least, inner surface is formed using a conductor is attached to the first plane side of the dielectric substrate 100, and a first dielectric lens 300c having a lens curved plane 310d the number of which is the same as that of radiation units is arranged around a radiation-side opening of the first horn 200a.

The first horn 200a is a waveguide, and is formed in a tapered shape to radiate radio waves. The first dielectric lens 300c forms a convex shape towards the radiation unit 110a side (the incident plane side). The first dielectric lens 300c of the fifth embodiment has a lens curved plane on the radiation plane side.

Next, functions of the antenna of the fifth embodiment will be described. As described in the first embodiment, radio waves radiated from the first radiation unit 110a propagate perpendicular to an opening plane C1-C1' because the direction of the radio waves on the opening plane C1-C1' of the horn 200a is converted into flat plane waves by the convex plane shape of the incident plane of the dielectric lens 300c.

The lens curved plane 310d of the dielectric lens 300a on the radiation side is configured in a concave cylindrical shape, and has the circle center shifted in the horizontal direction from the optical axis line of the convex plane of the incident plane. A Plane vertical to the dielectric lens 300c from the circle center of the cylindrical curved plane is parallel to the opening plane C1-C1' of the first horn 200a.

The inclination degrees of the other cylindrical curved planes differ depending on the distance from the circle center, and thus radio waves are refracted in accordance with the inclination degrees. As a result, in the antenna of the fifth embodiment, the half-value width of the beam can be changed on the basis of the curved plane degree (corresponding to the radius of a circle in the cylindrical curved plane) of the lens curved plane 310d formed using a concave plane while inclining the maximum gain angle orientation in the horizontal direction.

In addition, the incident plane of the dielectric lens shown in each of the first embodiment to the fourth embodiment is a convex plane. However, if the incident plane is a concave plane (the sign of the coefficient of the hyperbolic function is inverted), the phase on the opening plane flat plane C1-C1' of the first horn 200a can further compress the wavefront curvature of radio waves radiated from the first radiation unit 110a. The half-value width of the beam can be further widened by being combined with the concave plane of the dielectric lens on the radiation side.

Sixth Embodiment

Figure 12:
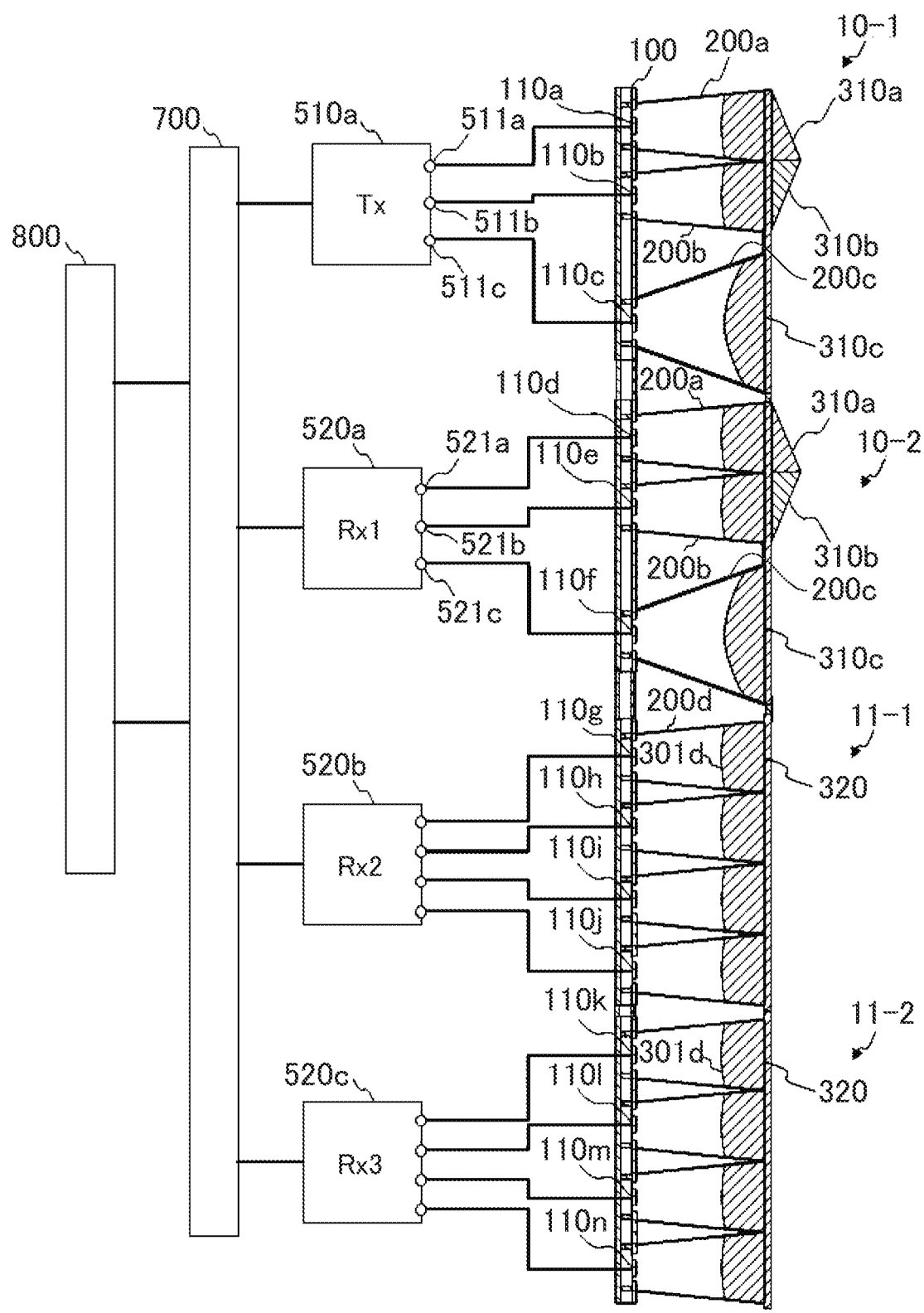
FIG. 12 shows a sixth embodiment of the present invention, and is a block diagram of an in-vehicle system having a radar including a flat beam generation antenna.

FIG. 12 is a block diagram for showing an example of an in-vehicle system having a radar including a flat beam generation array antenna of a sixth embodiment.

The in-vehicle system of the sixth embodiment has flat beam generation array antennas 10-1 and 10-2 of the first to fifth embodiments, array antennas 11-1 and 11-2 having a plurality of dielectric lenses 301d that receives radio waves with a flat plane 320, a first transmission circuit 510a, a first reception circuit 520a, a second reception circuit 520b, a third reception circuit 520c, a signal processing circuit (a signal processing unit) 700, and a vehicle control circuit (a vehicle control unit) 800.

In the flat beam generation array antennas 10-1, 10-2, 11-1, and 11-2, opening planes of horns 200a to 200d are arranged on the same flat plane.

A first radiation unit 110a, a second radiation unit 110b, and a third radiation unit 110c of the flat beam generation array antenna 10-1 are connected to the first transmission circuit 510a. A first radiation (reception) unit 110d, a second radiation unit 110e, and a third radiation unit 110f of the flat beam generation array antenna 10-2 are connected to the first reception circuit 520a.

A first radiation (reception) unit 110g, a second radiation unit 110h, a third radiation unit 110i, and a fourth radiation unit 110j of the array antenna 11-1 are connected to the second reception circuit 520b. A first radiation (reception) unit 110k, a second radiation unit 110l, a third radiation unit 110m, and a fourth radiation unit 110n of the array antenna 11-2 are connected to the third reception circuit 520c.

The signal processing circuit 700 is connected to the first transmission circuit 510a, the first reception circuit 520a, the second reception circuit 520b, and the third reception circuit 520c. The signal processing circuit 700 supplies signal information to be transmitted from the antenna to the first transmission circuit 510a, and processes signals output from the first reception circuit 520a, the second reception circuit 520b, and the third reception circuit 520c.

The vehicle control circuit 800 is connected to the signal processing circuit 700. The vehicle control circuit 800 and the signal processing circuit 700 may be connected to each other by a wire using a cable or the like or by radio such as a wireless LAN (Local Access Network).

In addition, the vehicle control circuit 800 recognizes the position of and the distance to an obstacle or the like using a signal output from the signal processing circuit 700, and outputs a control signal to a power train control unit and a vehicle body control unit, so that the behavior of a mobile object in accordance with surrounding conditions can be controlled. Accordingly, the in-vehicle system of the sixth embodiment functions as a driving support system.

The preferred modes of the structures and functions of a flat beam generation array antenna, a radar having the flat beam generation array antenna, and an in-vehicle system having the radar of the present invention have been described above using the first to sixth embodiments. The number of radiation units configuring the flat beam generation array antenna of the present invention may differ in the first to sixth embodiments, and effects of the flat beam generation array antenna of the present invention can be obtained.

In addition, the number of kinds and combinations of flat beam generation array antennas and radars having the flat beam generation array antennas may be an arbitrary combination other than the above-described embodiments.

Further, the material configuring the dielectric substrate 100 may be any one of a resin material, a ceramic material, and a semiconductor material.

According to the embodiments of the present invention as described above, provided are a plurality of radiation units formed on a substrate, a dielectric lens that converts spherical waves radiated from each radiation unit into flat plane waves, and a plurality of horns that leads radio waves from the radiation units to the dielectric lens. The shape of a cross section of the dielectric lens perpendicular to the radiation direction of a beam is formed to radiate a beam whose second direction is narrower than a first direction orthogonal to the second direction, and a part of a radiation plane of the dielectric lens has an inclined plane. Accordingly, it is possible to realize a radar that generates multiple beams whose maximum gain orientations are inclined in the front direction or horizontal direction.

If projection parts are attached to the horns used for an antenna, convex curved planes of incident planes formed on the dielectric lens are arranged while being aligned in the second direction so that radiated beams are spatially synthesized before and after the dielectric lens. Thus, the dielectric lens can be downsized to shorten the focal distance. Therefore, the antenna that generates a flat beam can be downsized. In particular, a tip end of the shape of the projection part is shortened by about a wavelength on the radiation unit side with respect to a horn opening plane. Accordingly, the electric power distribution such as the Talor line-source in which the radio wave intensity is peaked around the center of the dielectric lens can be formed, and high-gain antenna characteristics with the side lobe suppressed can be obtained.

In addition, the horn has a shape in which the second direction is longer than the first direction, and the horn and the dielectric lens are installed so that the first direction is set in the horizontal direction and the second direction is set in the perpendicular direction. Accordingly, a flat beam whose width is wider in the horizontal direction can be generated.

In addition, when the radiation units are arranged while being aligned in the vertical and horizontal directions, the angle of an obstacle can be detected from the horizontal direction and the perpendicular direction. For example, it is possible to separately detect an upward slope and an obstacle in the forward direction.

It should be noted that the present invention is not limited to the above-described embodiments, and includes various modified examples and equivalent configurations in the scope of the attached claims. For example, the embodiments have been described in detail to easily understand the present invention, and the present invention is not necessarily limited to those including all the configurations described above. In addition, some configurations of an embodiment may be replaced by a configuration of another embodiment. In addition, a configuration of an embodiment may be added to a configuration of another embodiment. In addition, some configurations of an embodiment may be added to, deleted from, and replaced by other configurations.

In addition, some or all of the above-described configurations, functions, processing units, processing means, and the like may be realized using hardware by designing with, for example, integrated circuits, or may be realized using software in such a manner that a processor interprets and executes a program realizing each function.

Information of a program, a table, a file, and the like realizing each function can be stored in a storage device such as a memory, a hard disk, or an SSD (Solid State Drive), or a recording medium such as an IC card, an SD card, or a DVD.

In addition, the control lines and the information lines considered to be necessary in the explanation are shown, but all the control lines and the information lines that need to be mounted are not necessarily shown. In practice, almost all the configurations may be considered to be connected to each other.

The invention claimed is:

1. An antenna comprising:
a radiation unit that is formed on a substrate;
a waveguide that propagates therein radio waves radiated from the radiation unit and radiates the radio waves as a beam; and
a dielectric lens that is arranged in an opening of the waveguide and has an incident plane facing the radiation unit and a radiation plane radiating radio waves entered from the incident plane, wherein the radiation plane of the dielectric lens has a plane orientation different from a flat plane perpendicular to the radiation direction of the beam, wherein the radiation plane of the dielectric lens has a flat inclined surface having a predetermined angle with respect to a flat plane perpendicular to the radiation direction of the beam at a predetermined position nearer to the radiation direction side of the beam than an opening plane of the waveguide.

2. The antenna according to claim 1, wherein the radiation unit has a first radiation unit and a second radiation unit, wherein the waveguide has a first waveguide that propagates therein radio waves radiated from the first radiation unit and radiates the radio waves as a beam and a second waveguide that propagates therein radio waves radiated from the second radiation unit and radiates the radio waves as a beam, wherein the dielectric lens has a first dielectric lens that is arranged in an opening of the first waveguide and has an incident plane facing the first radiation unit and a first radiation plane radiating radio waves entered from the incident plane, and a second dielectric lens that is arranged in an opening of the second waveguide and has an incident plane facing the second radiation unit and a second radiation plane radiating radio waves entered from the incident plane, wherein the radiation plane of the first dielectric lens has a flat plane parallel to an opening plane of the first waveguide at the opening plane, and wherein the radiation plane of the second dielectric lens has an inclined plane having a predetermined angle with respect to a flat plane perpendicular to the radiation direction of the beam at a predetermined position nearer to the radiation direction side of the beam than an opening plane of the second waveguide.

3. The antenna according to claim 1, wherein the radiation unit has a first radiation unit, a second radiation unit, and a third radiation unit, wherein the waveguide has a first waveguide that propagates therein radio waves radiated from the first radiation unit and radiates the radio waves as a beam, a second waveguide that propagates therein radio waves radiated from the second radiation unit and radiates the radio waves as a beam, and a third waveguide that propagates therein radio waves radiated from the third radiation unit and radiates the radio waves as a beam, wherein the dielectric lens has a first dielectric lens that is arranged in an opening of the first waveguide and has an incident plane facing the first radiation unit and a first radiation plane radiating radio waves entered from the incident plane, a second dielectric lens that is arranged in an opening of the second waveguide and has an incident plane facing the second radiation unit and a second radiation plane radiating radio waves entered from the incident plane, and a third dielectric lens that is arranged in an opening of the third waveguide and has an incident plane facing the third radiation unit and a third radiation plane radiating radio waves entered from the incident plane, wherein the radiation plane of the first dielectric lens has a flat plane parallel to an opening plane of the first waveguide at the opening plane, wherein the radiation plane of the second dielectric lens has an inclined plane having a predetermined angle with respect to a flat plane perpendicular to the radiation direction of the beam at a predetermined position nearer to the radiation direction side of the beam than an opening plane of the second waveguide, and wherein the radiation plane of the third dielectric lens has an inclined plane having a predetermined angle with respect to a flat plane perpendicular to the radiation direction of the beam at a predetermined position nearer to the radiation direction side of the beam than an opening plane of the third waveguide, and the inclined plane has a plane orientation different from the radiation plane of the second dielectric lens.

4. The antenna according to claim 1, wherein a plurality of radiation units is formed on the substrate, wherein the waveguide propagates therein radio waves radiated from each of the plurality of radiation units and radiates the radio waves as a beam, wherein the dielectric lens is arranged in an opening of the waveguide and has a plurality of incident planes facing the plurality of radiation units and a radiation plane radiating radio waves entered from the incident plane, wherein the waveguide includes a projection part formed in a tapered shape between the plurality of radiation units, wherein a tip end of the projection part is formed nearer to the radiation side of the beam than the opening plane of the waveguide, and wherein the radiation plane of the dielectric lens has a plane orientation different from a flat plane perpendicular to the radiation direction of the beam.

5. The antenna according to claim 1, wherein a cross section of the waveguide is monotonically enlarged from the radiation unit towards the opening, and wherein the waveguide is brought into contact with the dielectric lens in the opening opposite to the radiation unit.

6. The antenna according to claim 1, wherein the shape of a cross section of the waveguide perpendicular to the radiation direction of the beam is formed to radiate a beam whose second direction is narrower than a first direction orthogonal to the second direction, and wherein the incident plane facing the radiation unit is configured in a convex plane shape towards the radiation unit.

7. The antenna according to claim 1, wherein the radiation plane of the dielectric lens is formed using a predetermined curved plane.

8. An array antenna having the plurality of antennas described in claim 1, wherein the opening planes of the waveguides are arranged on the same flat plane.

9. A radar apparatus having the antenna described in claim 1, wherein at least one of a transmission circuit and a reception circuit is provided, and wherein each of the transmission circuit and the reception circuit is connected to the radiation unit.

10. An in-vehicle system having the antenna described in claim 1, wherein at least one of a transmission circuit and a reception circuit is provided, wherein each of the transmission circuit and the reception circuit is connected to the radiation unit, and wherein a signal processing unit connected to the transmission circuit and the reception circuit and a vehicle control unit connected to the signal processing unit are provided.

* * * * *